United States Patent [19]
Gendrot et al.

[11] 3,926,511
[45] Dec. 16, 1975

[54] METHOD AND DEVICE FOR SYNCHRONIZING THE DISPLACEMENTS OF TWO MOVING BODIES

[76] Inventors: Andre Jean-Claude Gendrot, 102 rue Anatole France, 93 - Drancy; Jean Lucien Yves Chartrin, 2, Quai Villebois-Mareuil, 41 - Bloise, both of France

[22] Filed: Jan. 2, 1974

[21] Appl. No.: 429,757

Related U.S. Application Data

[63] Continuation of Ser. No. 208,350, Dec. 15, 1971, abandoned.

[30] Foreign Application Priority Data

Dec. 16, 1970  France .................... 70.45422

[52] U.S. Cl. .................... 352/5; 352/12; 352/15; 352/17; 352/19; 352/31
[51] Int. Cl.² ................................ G03B 31/04
[58] Field of Search ............ 318/70, 74, 75, 77, 78, 318/85; 352/5, 12, 15, 17, 19, 31

[56] References Cited
UNITED STATES PATENTS

| | | | |
|---|---|---|---|
| 2,310,340 | 2/1943 | Arndt | 318/85 X |
| 2,760,137 | 8/1956 | Andreios | 318/85 X |
| 3,020,532 | 2/1962 | Schlafly | 318/85 X |
| 3,064,173 | 11/1962 | Breen et al. | 318/85 X |
| 3,260,909 | 7/1966 | Green et al. | 318/85 X |
| 3,408,549 | 10/1968 | Shimabukuro | 318/85 |
| 3,462,665 | 8/1969 | Esply et al. | 318/85 |
| 3,588,558 | 6/1971 | Levin | 352/17 X |
| 3,609,019 | 9/1971 | Tuber | 352/17 |
| 3,622,703 | 11/1971 | Ricketts et al. | 318/85 X |

Primary Examiner—Samuel S. Matthews
Assistant Examiner—Russell E. Adams, Jr.

[57] ABSTRACT

Two independently moving bodies, such as a picture film and a sound tape are moved past respective reference points in a camera or projector and in a recorder, respectively. "Pips" generated by the camera drive are recorded on the tape. During playback, the "pips" from the projector and recorder are counted by a synchronizing device. The count difference in the form of an electrical signal is used for controlling the motion of the film or tape. Ideal or perfect synchronization is achieved by selectively and momentarily manually discontinuing either of the counts. The sound record is thereafter transferred onto a blank sound track of the film.

14 Claims, 12 Drawing Figures

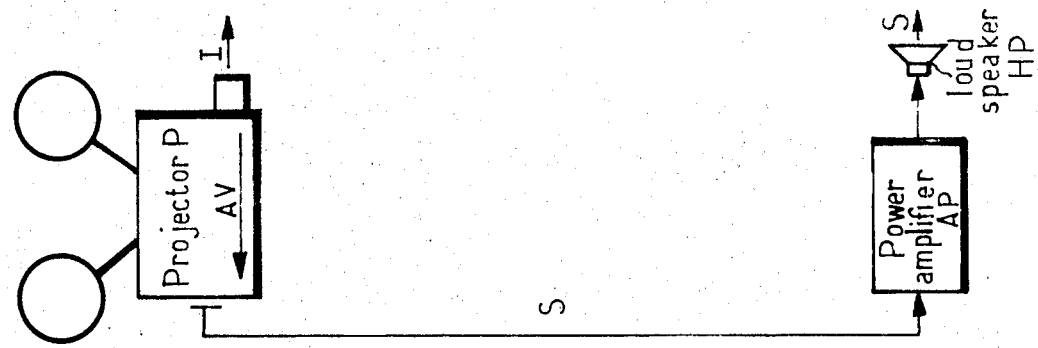
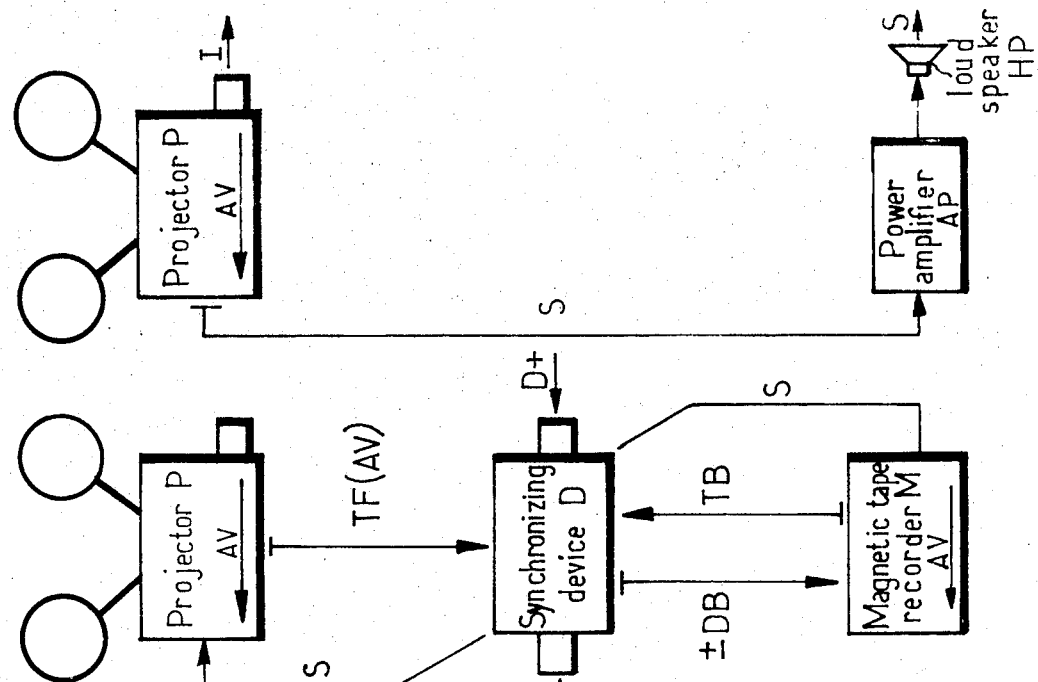
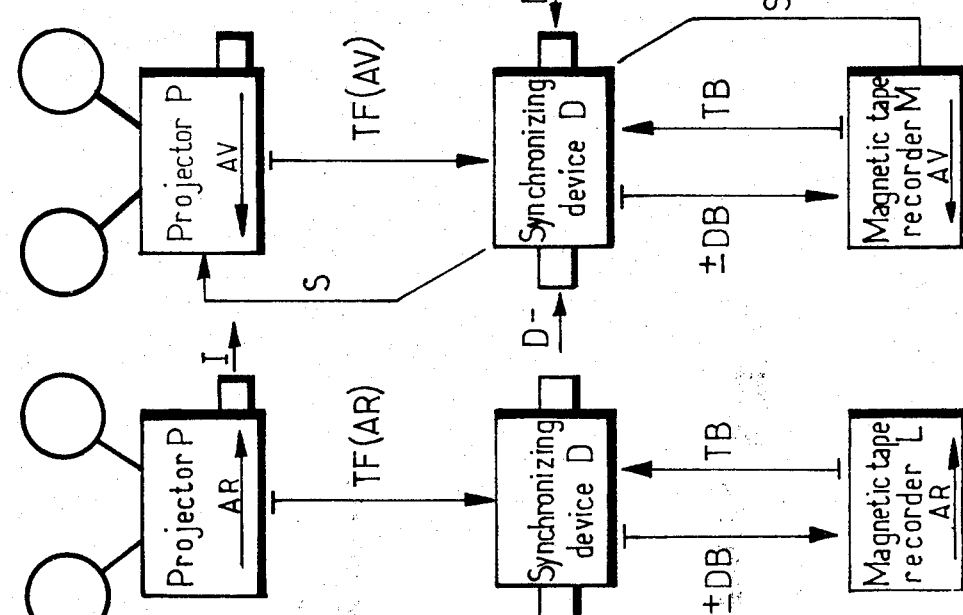
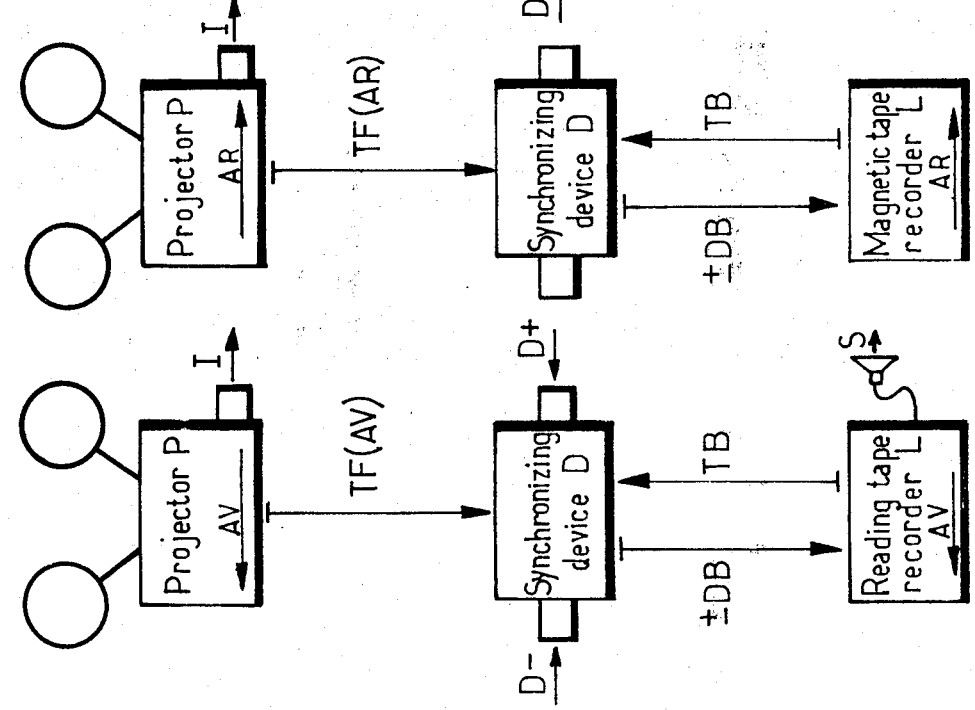
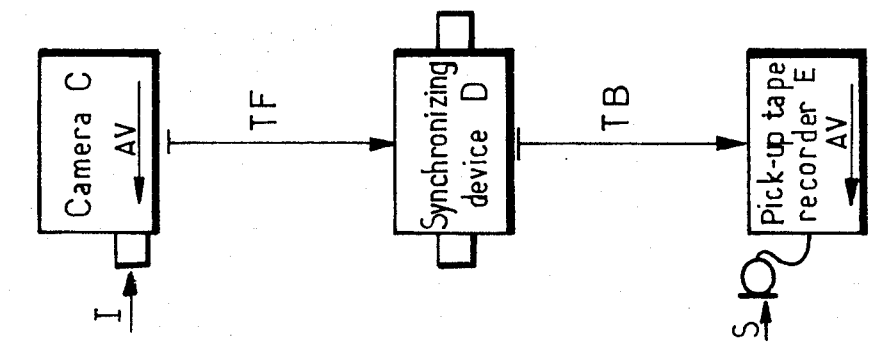

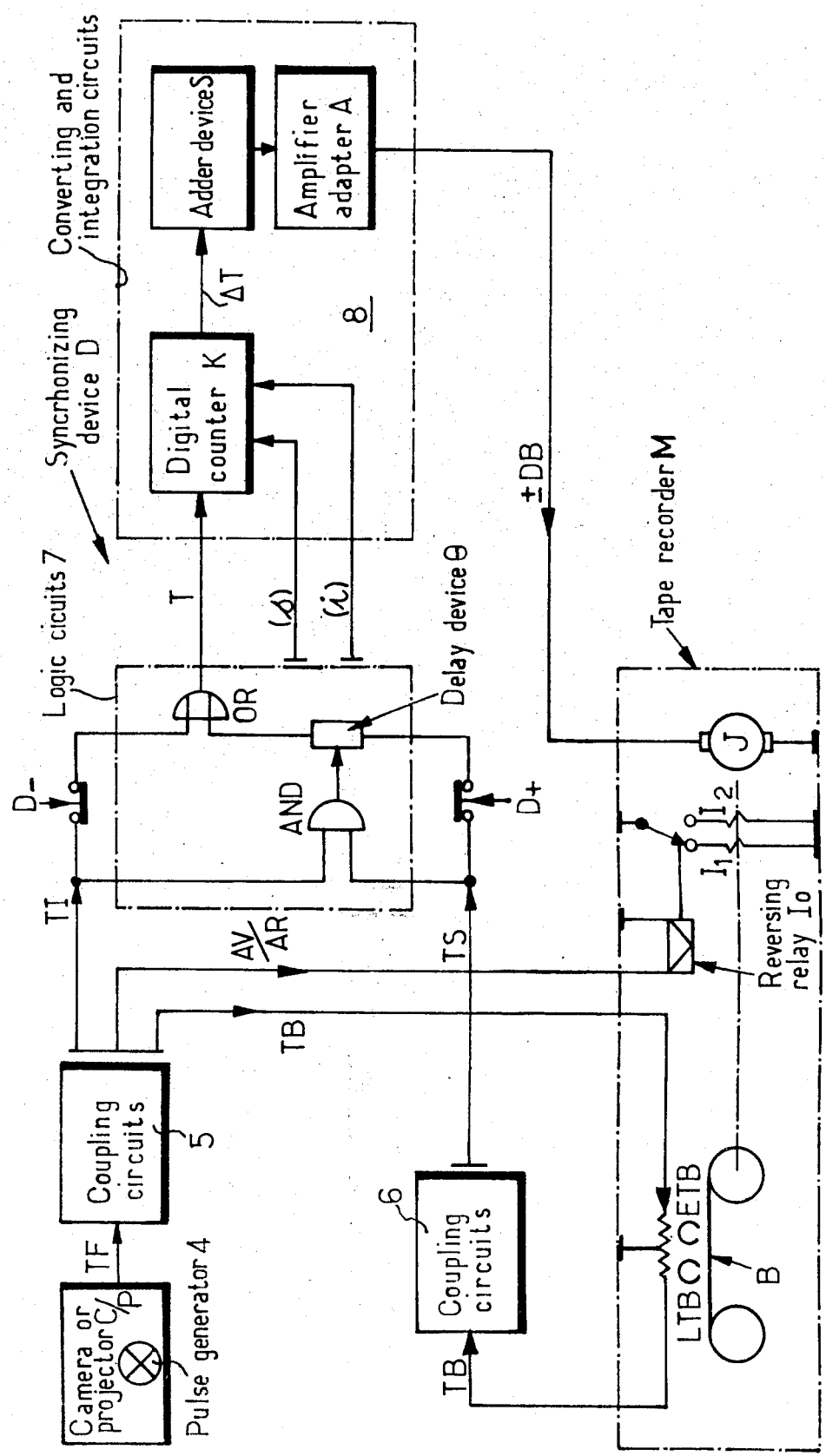

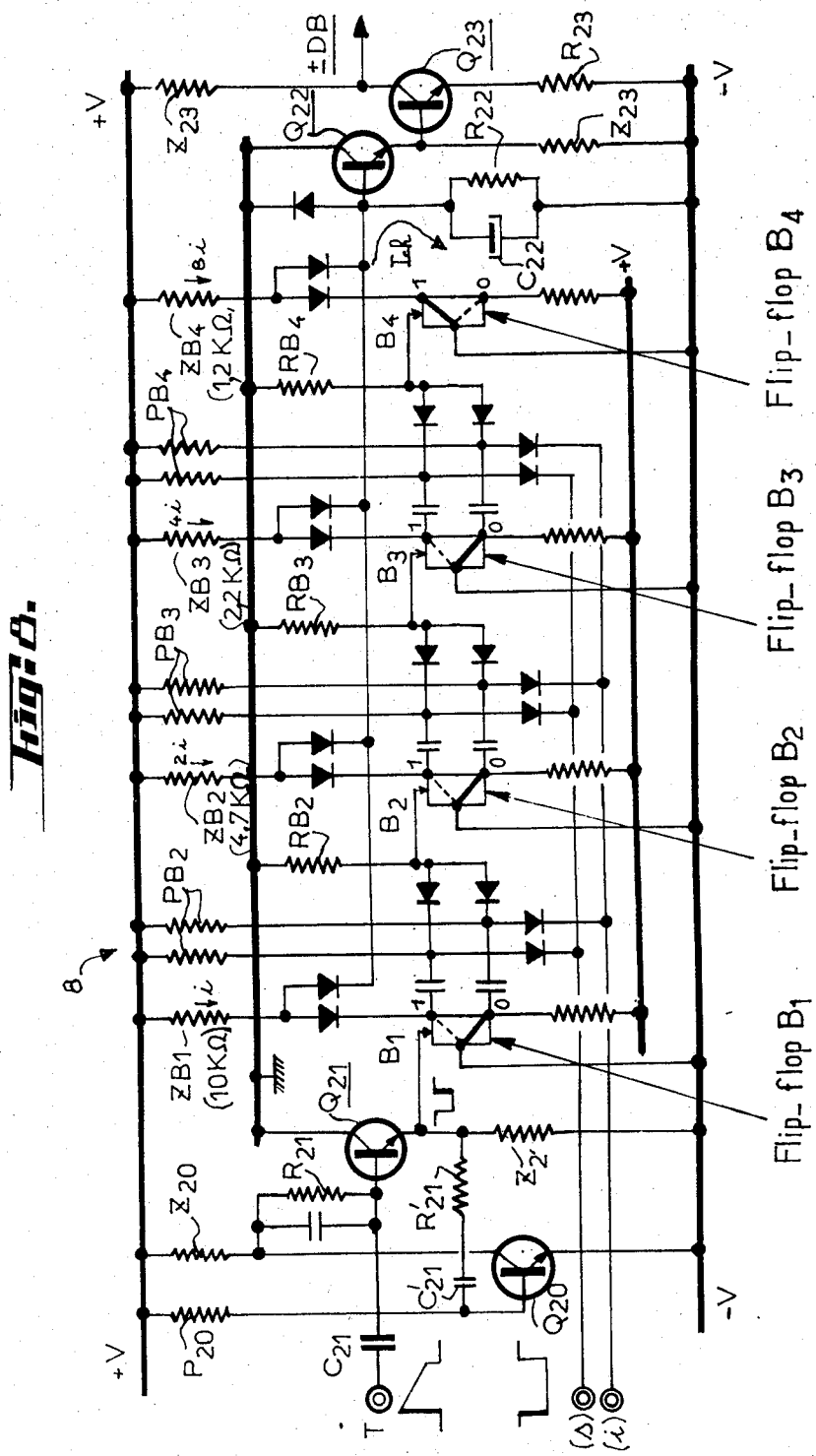

METHOD AND DEVICE FOR SYNCHRONIZING THE DISPLACEMENTS OF TWO MOVING BODIES

The present application is a continuation of U.S. application 208,350 filed Dec. 15, 1971, now abandoned.

The present invention relates generally to a method and device adapted to enable mutual phase locking, monitoring, servo-control or follow-up, without any positive kinematic connection and in a reproducible manner, of the motions of at least two independent moving bodies which travel past respective reference points.

These moving bodies may indifferently consist of a thread, yarn or wire, a tape, a strip or any other flexible or yielding linear structure open or closed on itself or of a table, a plate, a sectional or profile-shaped bar or of any other stiff element of finite length moving in parallel relation to its length or also of an arc, a disk, a cylinder or other member forming a solid of revolution turning about its axis.

Also the motions of these moving bodies may proceed at a constant or variable speed, in a continuous steady or step-wise manner and in a constant or periodically reversed or alternating direction.

This means that the invention is likely to have vary various applications such as the driving of the rollers of a rotary press for multi-colour or polychromatic printing and of the paper web to be printed, the co-ordination of the operation of conveyors with successive or respectively coupled belts for carrying or forwarding or regulating the feed of materials, preventing the skidding or slipping of the non-coupled driving axles of a railway vehicle and the phase-locking of the motions of machining heads with the displacement of a table or other movable support or holder for a work piece to be machined with a machine tool or transfer machine.

The invention is however in particular adapted to enable the transfer onto a film, in good synchronized relationship with the image or picture, of a sound record effected in other respects during taking of pictures.

The method according to the invention is essentially characterized in that it consists, during a previous step, in moving the moving bodies past their reference points and in putting a mark periodically and at the same time on each one of the moving bodies as it travels past its reference point, then

- in moving the moving bodies so marked again and independently past their reference point while reading the marks borne by each one of them as they travel past their reference point to provide a signal at the reading of each mark;
- in counting the signals issued from the reading of the marks put on either one of the moving bodies, respectively;
- and in using the difference between both counts to act upon the motion of at least one of said moving bodies so as to reduce said difference.

According to an alternative embodiment of the method of the invention, one of the moving bodies may be initially provided with marks moving successively past its reference point. In such a case, the previous step consists in making the moving bodies move past their respective reference points and in putting a mark on that moving body which is devoid thereof as it travels past its reference point and at the moment where a mark borne by the other moving body moves past its own reference point, the further steps being the same as previously.

In both cases, during the preliminary step, the relative displacements of the moving bodies may be of any magnitudes or they may follow a given law according as their travelling motions are respectively independent of or kinematically coupled with each other.

The method thus defined is adequate to achieve the mutual phase-locking of the travelling speeds of the moving bodies in the case where these speeds remain constant and equal or proportional at least during said previous step and with the assumption that these moving bodies are each one provided with substantially constant spacing marks. Except in this particular case, the reproduction of the mutual phase-locking of the travelling speeds of the moving bodies involves that at least two marks, having been present in coinciding relationship at the reference points during the previous step may again be brought into coincidence at the beginning or in the course of the step of restoring or reproducing their mutually phase-locked motions.

For this purpose and according to another characterizing feature of the method according to the invention, the count of the signals issued from the reading of the marks provided on either of the moving bodies may be discontinued momentarily. Such an action results in artificially increasing or decreasing the difference between the counts of the signals issued from the reading of the marks and in view of the phase-locking of the speeds inherent to the method, in momentarily slowing down or accelerating one of the moving bodies with respect to the other. The relative leads or lags resulting therefrom enable to bring both aforesaid marks back to their coinciding condition.

In the case where these two marks are located at the zero point of the moving bodies with reference to their travelling direction, the simultaneous passage of said marks past the reference points may be obtained by having the moving bodies moved past in a normal direction until the difference between said counts is reduced to zero and then by reversing the travelling direction of the moving bodies while keeping said difference at a zero value.

The device according to the invention for practising the aforesaid method is characterized in that it essentially comprises:

- driving means to provide the travelling motion of the moving bodies past their reference points,
- marking means arranged at these points to put a mark periodically and simultaneously on each one of the moving bodies,
- reading means arranged at these same points for generating a signal at the passage of each mark,
- counting means for counting the signals respectively issued from the reading of the marks put on either of the moving bodies,
- means for comparing these counts providing an output signal depending upon their differences,
- and operating control means using this output signal to change the travelling speed of at least one of the moving bodies by acting upon its drive means in a direction adequate for reducing said difference.

In an alternative embodiment usable in the case where one of the moving bodies is initially provided with marks moving successively past its reference point, the device essentially exhibits the same structure as mentioned hereinabove except for the marking means for that moving body which is originally provided with marks.

Desirably the means for reading the marks carried by at least one of the moving bodies comprise a Hall generator energized by a magnet movable in rotation or translation and coupled with the drive means of said moving body.

Such an arrangement has the advantage to enable, when the movable magnet carries out complete revolutions or round runs separated by rest periods, to discriminate the direction of motion of the moving body involved hence to control in corresponding relationship the direction of motion of the other moving body.

According to a further essential aspect of the device according to the invention, the means for counting the signals respectively issued from the reading of the marks provided on either of the moving bodies comprise circuits through which said signals are converted into identical pulses attended each one by a signal showing the origin thereof and circuits including a single counter to or from the contents of which said pulses are added or subtracted according to their origin.

Advantageously these latter circuits comprise means effective to retard the feeding of each pulse into the counter with respect to that of its signal of origin.

These arrangements offer the advantage to reduce the number of elements required for the manufacture of the device and therefore to reduce the cost price thereof while improving the reliability, the single counter being prepared to count any pulse in the desired direction prior to its arrival.

The contents of this counter control the load current supplied to a capacitor shunted by a resistor, so that the mean voltage across said capacitor may be used to determine the value of the signal alterating the travelling velocity of at least one of the moving bodies.

Desirably the flip-flop circuits forming the counter control each one the supply to said capacitor through a resistor associated to said flip-flop circuit, the ohmic value of these resistors decreasing preferably in accordance with the rank of the corresponding flip-flop circuits within the counter.

According to still another essential aspect of the device according to the invention, ahead of said counting means are arranged delay or "non-coincidence" circuits receiving signals issued from the reading of the marks provided on either of the moving bodies and through which one of both simultaneously received signals is delayed or made to lag. These circuits provide in other respects for the conversion of the received signals into identical pulses attended each one by a signal indicating the origin thereof.

The device of such a construction is quite particularly although not exclusively intended to be used for transferring onto a blank or unimpressed sound-track of a previously developped film, a sound record carried out while taking pictures for example on a magnetic tape and this while enabling to achieve the perfect synchronization of the sound with the images or pictures.

Further characterizing features and advantages of the invention will appear more clearly upon reading the following detailed description of a non-limiting form of embodiment given by way of example only and illustrated by the accompanying drawings, wherein:

- FIG. 1 diagrammatically shows the five successive steps (a–e) of using the method and the device according to the invention for synchronizing a sound film or talking motion picture;

- FIG. 2 is the block diagram of the device according to the invention;

Figure 4:
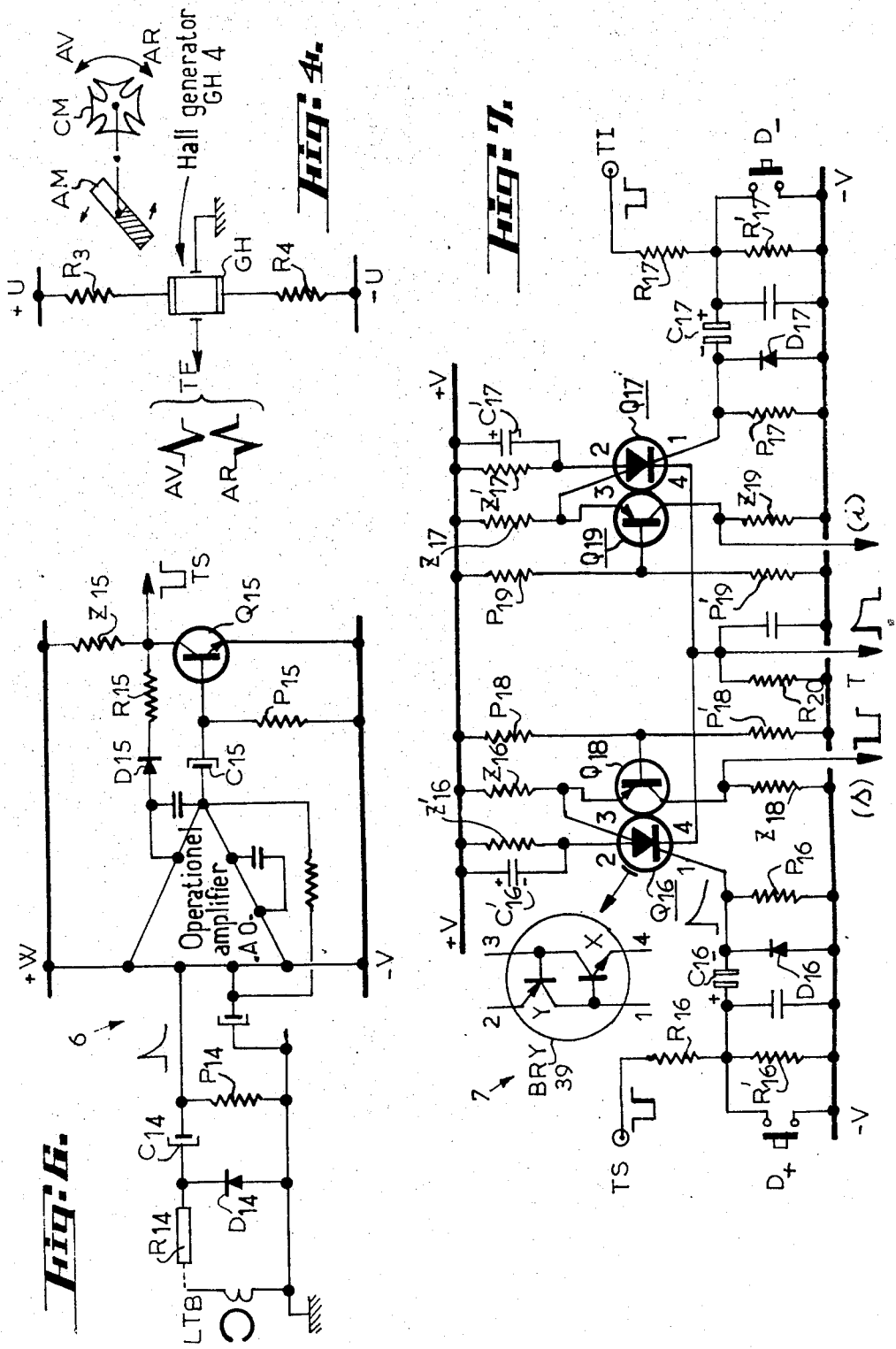
Figure 5:
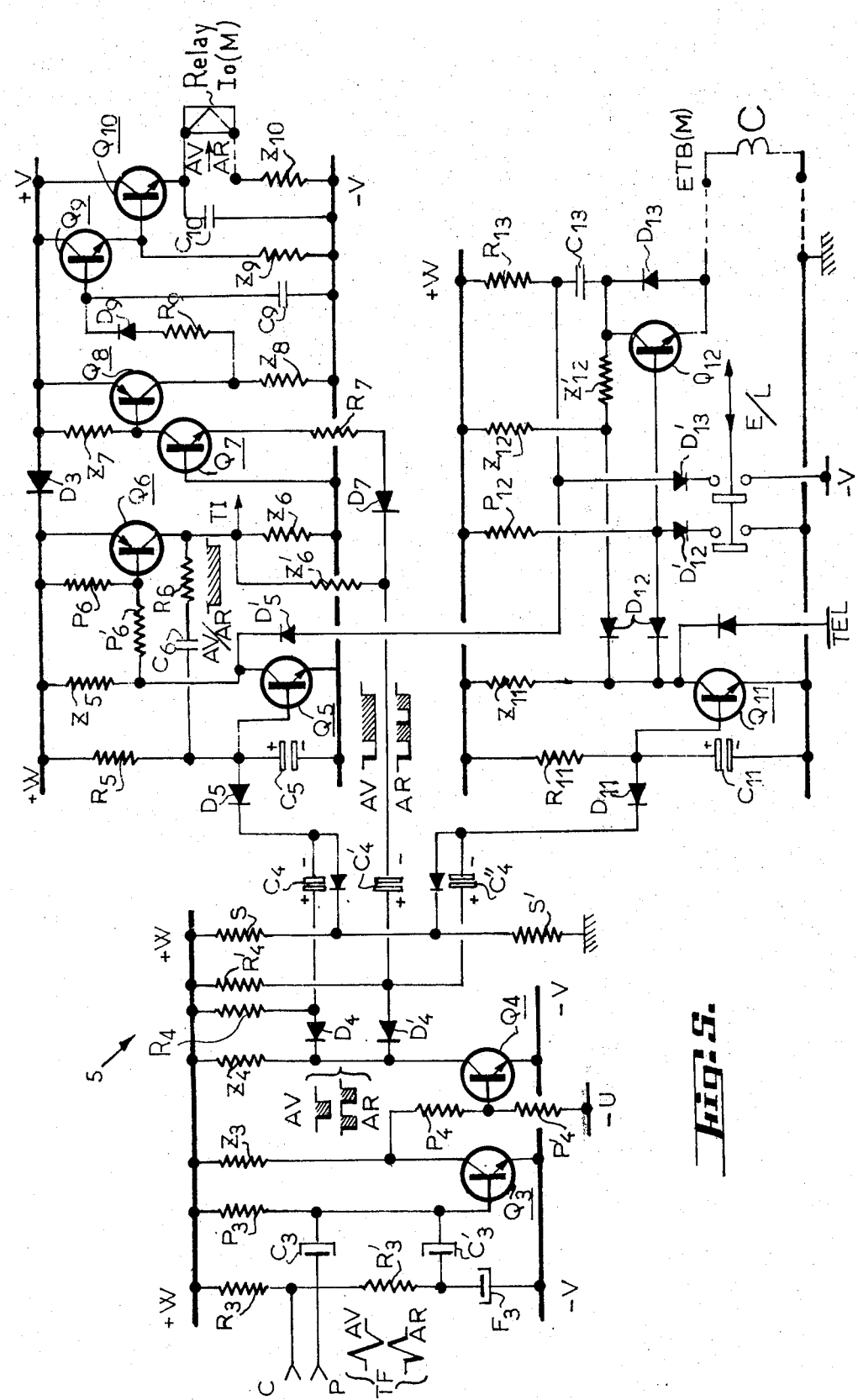

- FIG. 4 diagrammatically shows a pulse generator adapted to be incorporated into a camera or a projector for coupling same to the device according to the invention;

- FIGS. 5 and 6 are detailed diagrams illustrating circuits for coupling said camera or projector and magnetic tape recorder to the device according to the invention;

- FIG. 7 shows a detailed diagram of pulse processing circuits incorporated into the device according to the invention; and

- FIG. 8 illustrates the detailed diagram of digital-analogue conversion pulse counting and phase-lock generating circuits incorporated into the device according to the invention.

The synchronization of the picture and of the sound on a film is provided according to the invention in five successive operative steps illustrated by the diagrams a – e, respectively, of FIG. 1:

During the initial step a, pictures I are recorded on a blank film by means of a camera C whereas the sound S corresponding to the filmed scene is simultaneously recorded on a magnetic tape by means of a magnetic tape recorder E. Film pulses or "pips" TF generated within the camera C in synchronism with the film unwinding are converted by the coupling circuits incorporated into a device D according to the invention into tape pulses or pips TB which are applied to the magnetic tape recorder E for being recorded on a track, assigned to such a use, of the magnetic tape forming the recording medium, carrier or support for the sound S. The moving off speed of the film and of the magnetic tape are controlled independently by regulators incorporated for this purpose into the camera C and into the magnetic tape recorder E, respectively.

During the step b, the developped film provided with a blank sound recording track is mounted on a projector P which reproduces the pictures I whereas the recorded magnetic tape is mounted on a reading tape recorder L to reproduce or play back the sound S. The pick-up tape recorder E and the reading or playback tape recorder L may of course consist of one and a same apparatus M used in either of the embodiments, respectively. A pulse generator incorporated into the projector P sends to the synchronizing device D film pips TF, the recurrence rate or pulse repetition frequency of which corresponds to the film moving off speed and the shape of which as will be seen hereinafter corresponds to the film moving off direction which is normal (AV) during this step b so as to provide a good playback of the filmed scene. The synchronizing device D further receives from the magnetic tape recorder M the tape pips TB initially recorded on the magnetic tape which moves off during this step in the normal unwinding direction (AV) so as to provide the playback or reproduction of the sound S. In return, the device D sends to the tape recorder M an order or command of modulation of the magnetic tape unwinding speed ± DB by which the magnetic tape unwinding speed is changed so that a tape pip TB corresponds to each film pip TF as this was the case during the initial step of taking pictures a. This means that the device D synchronizes the translatory motion of the magnetic tape within the tape recorder M with the translatory motion of the film within the projector P.

This does not at all involve a good synchronization of the sound S with the picture E: as a matter of fact, at the beginning of step $b$, the film and the magnetic tape are independently positioned within the projector P and the tape recorder M, respectively, so that the sound S is generally leading or lagging with respect to the pictures I. Moreover if the developped film has undergone a mountage, the number and order of the image or picture sequences I during projection do no longer correspond to the number and order of the sequences filmed during the shot or take, whereas the sound record on the non-mounted magnetic tape has remained such as it was during sound pick-up. Under these circumstances, during projection of each image sequence I, it is necessary to find out the corresponding sound record on the magnetic tape. Thus, whether the film has been mounted or not, it is necessary not only to phaselock the running motion of the magnetic tape with that of the film, and this is automatically provided by the device D, but also to restore the accurate synchronism of the sound S with the images or pictures I.

To this end, the synchronizing device D is provided with a pair of push-buttons D–, D+ which upon being depressed manually cancel the film pips TF and the tape pips TB, respectively, thereby resulting in variations in the order of the magnetic tape unwinding speed ± DB by which the slowing down and acceleration of the magnetic tape unwinding are operated, respectively. It is thus possible to restore a perfect synchronization of the sound S with the pictures I through successive retouchings by acting alternately on the push-buttons D+, D–. When the perfect synchronization of the sound and of the picture is thus achieved at any time during a sequence, the step $b$ is completed.

During the next step c the projector P working according to a reverse motion operates the film rewinding at least up to the beginning of the sequence involved. During this step, the synchronizing device D receives from the projector P film pips TF to rate and the shape of which correspond to the film travelling speed and direction, respectively. The device D receives on the other hand from the tape recorder M tape pips TB recorded on the magnetic tape. In return, the device D controls the rewinding of the magnetic tape and monitors the speed thereof so as to keep the perfect synchronization previously obtained. By simple stopping of the projector P, the operator terminates the step c of synchronous film and magnetic tape rewinding as soon as he finds out that the projected images I correspond to the beginning of the sequence.

During the following step $d$ the projector P and the tape recorder M oeprate in the normal direction AV, their coupling through the device D providing automatically as previously for the synchronous travelling of the film and magnetic tape and this at least from the beginning to the end of the sequence involved. During this operation, the recording of the sound S read or played back on the magnetic tape by the tape recorder M is transferred onto the magnetic scoring track of the film by recording means incorporated for this purpose into the projector P. Thus, at the end of the step d at least one film sequence is scored, and this in perfectly synchronized relationship.

In the case where the film has undergone a mountage, its varous sequences are scored through mere repetition of the sequence of operations corresponding to the steps $b$, $c$ and $d$. Of course, between the sequences thus scored, it is possible to transfer onto the film magnetic track sound recordings coming from other sources than the tape recorded during the step $a$ of taking pictures.

As shown in $e$, the film thus scored may then be projected by means of a projector P fitted out from the outset or also accessorily provided with a power amplifier AP and loud speaker HP for reproducing the sound S recorded on the film magnetic track.

FIG. 2 is a block diagram showing the functional structure of the synchronizing device D and its relationships with the parts involved of the camera C or the projector P and the tape recorder M. In this Figure, the reference characters correspond to those of FIG. 1 whereas the reference numerals correspond to the Figures showing the detailed diagrams of the circuits involved.

The camera C or the projector P is fitted with a pulse generator 4 through which are produced the film pips TF which are applied to coupling circuits 5 forming an integral part of the device D. These coupling circuits 5 provide at the output on the one hand an order or direction of motion AV/AR for the tape recorder M and on the other hand either tape pips TB and during the picture-taking step $a$ to a write head ETB of the tape recorder M for their recording onto a special track of the magnetic tape B or also image pips TI sent to the device D during the synchronizing steps $b$, $c$ and $d$.

The tape recorder M comprises in addition to one or several pairs of sound write-read heads (not shown) and to the write head ETB for recording the tape pips mentioned hereinabove, a reading head LTB for the tape pips through which the latter may be read and applied during the synchronizing steps $b$, $c$ and $d$ to coupling circuits 6 by which the tape pips TB are converted into duly calibrated sound pips TS intended to be applied to the synchronizing device D. The tape recorder M further comprises means for reversing the direction of unwinding of the magnetic tape D consisting for example of a reversing relay IO operated by the run direction signal AV/AR issued by the coupling circuits 5 and providing in corresponding relationship for the switching of separate inductors I1, I2 of the drive motor J for the magnetic tape B.

The images and sound pips TI, TS respectively supplied by the coupling circuits 5 and 6 already mentioned during the synchronizing steps $b$, $c$ and $d$ are applied to logic circuits 7 forming an integral part of the synchronizing device D. These logic circuits 7 operatively comprise an "AND" gate ET at both inputs of which are applied the image pips TI and sound pips TS respectivey. In case of time coincidence of these signals, the AND gate energizes a delay device $\theta$ mounted in series with the push-button D+ by which the sound pips TS are applied to one of the outputs of an OR gate OU the other output of which receives the image pips TI through the medium of the push-button D–. This means that at the output of this "OR" gate appears a time-shifted or staggered pulse sequence T issuing from the image pips TI and the sound pips TS mutually time-imbricated, upon taking into account the possible actuation of the push-buttons D– and D+ during the synchronization seeking step $b$. The logic circuits 7 moreover comprise means (not shown) by which the origin of every pulse T appearing at the output of the OR gate is indicated by a signal $(s)$ or $(i)$.

The output signals from the logic circuits 7 are applied to the counting, digital to analogue converting and integration circuits 8 forming an integral part of the device D. These circuits 8 comprise a digital counter K carrying out the algebraic totalling of the pulses T supplied by the logic circuits 7, said pulses being counted positively or negatively, respectively, according as they are attended by a signal (s) or (i) supplied by these same logic circuits 7. The output signal from the counter K which corresponds to the instantaneous deviation $\Delta T$ of the counts of image pips TI and sound pips TS is applied to the input of an adder device S which provides for the time integration of the variations of said devation. The signal issuing from such an integration forms after its level has been increased by an amplifier-adapter A, the order or command for modulation of the above-mentioned tape unwinding speed $\pm$ DB which is applied to the armature J of the motor of the tape recorder M providing for the drive of the magnetic tape B.

Figure 3:
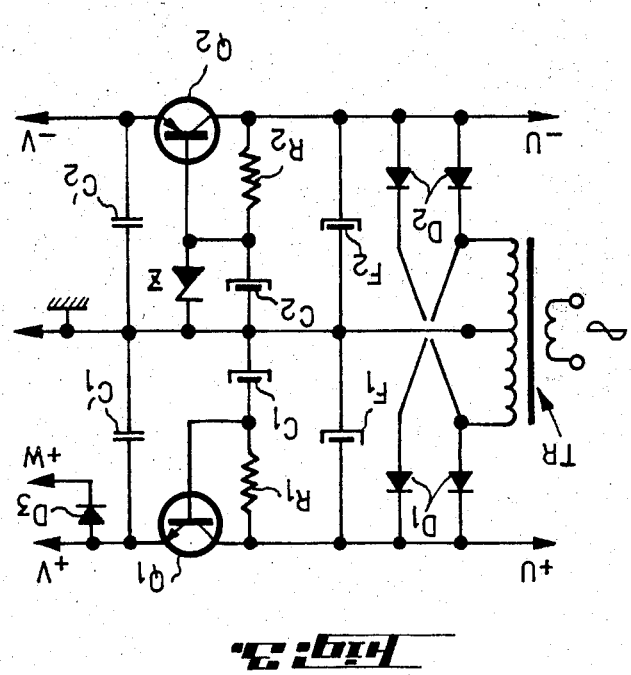
- FIG. 3 shows the detailed diagram of the feed circuits of the device.

FIG. 3 shows the detailed diagram of the feed circuits supplying the various voltages required by the operation of the device D: a voltage step-down transformer TR provided with a symmetrical secondary winding the central tap of which is grounded, feeds two pair of diodes D1, D2 by which are respectively supplied rectified voltages +U, −U smoothed by filter or smoothing capacitors F1, F2. From these voltages +U, −U are produced voltages +V, −V, respectively, controlled by transistors Q1, Q2 connected in series in the feed lines involved; the base of transistor Q1, of NPN type, is biased by the voltage across a regulating capacitor C1 supplied with the potential +U through a resistor R1; the base of transistor Q2, of PNP type, is also biased by means of a resistor R2 and capacitor C2 across which is connected a potential reference Zener diode Z. The emitters of transistors Q1, Q2 are a.c. decoupled by capacitors C'1, C'2, respectively. Finally a potential +W is derived from potential +V by flowing through a diode D3.

FIG. 4 diagrammatically shows an example preferred embodiment of the pulse generators incorporated into the camera C and projector P to provide the film pips TF representative of the speed and direction of travel of the film: a movable magnet AM actuated by the film drive mechanism designed symbolically by the Maltese cross or Geneva wheel CM carries out a complete revolution periodically in front of a Hall generator GH the feed electrodes of which are connected to voltage sources +U and −U, respectively, through the medium of resistors R3 and R4; the voltage generated by the Hall effect upon each revolution of the magnet AM forms the film pips TF defined with respect to the ground potential. Each one of these pips TF therefore appears substantially in the shape of a singwave period which comprises as shown one or two negative slopes according as the movable magnet AM rotates in the direction corresponding to the film forward motion AV or backward motion AR, respectively. This difference is used by the coupling circuits 5 which will now be described to generate in addition to the tape pips TB the order or command of run direction AV/AR intended to be applied to the relay IO for reversing the run direction of the tape recorder M.

At the input of the coupling circuits 5 the detailed diagram of which is given in FIG. 5 are applied the film pips TF issuing from the Hall generator 4 incorporated into the camera C or into the projector P. These film pips TF are processed by shaping circuits essentially comprising transistors Q3 and Q4:

The film pips TF issuing from the projector P show generally correct characteristics and are directly applied through the medium of a connecting capacitor C3 to the base of transistor U3; the film pips TF issuing from the camera C with less regular characteristics are processed by a correcting network consisting of resistors R3, R'3 and of a filter capacitor F3 before being applied by a connecting capacitor C'3 to the base of transistor Q3. The latter is normally on, its emitter being directly connected to the voltage source −V whereas its base and its collector are connected to the voltage +W through the medium of a biasing resistor P3 and a load resistor Z3, respectively. Consequently, transistor Q3 is blocked during the negative slopes of the film pips TF and therefore provides at the output one or two positive pulses according as the camera or the projector operates in forward motion AV or in reverse motion AR, respectively. These pulses are applied to a dividing bridge consisting of equal resistors P4, P'4 connected in series with the collector load Z3 of transistor Q3 between the voltage sources +W and −U. The base transistor Q4 being connected to the central tap of the divider bridge P4-P'4 whereas its emitter and its collector are connected directly to the source −V and through the medium of a load resistor Z4 to the source +W, respectively, this transistor is normally blocked or off and provides at the output negative pulses corresponding to the negative slopes of the film pips TF. These negative pulses are used to work out on the one hand the order of command of run direction AV/AR adapted to operate the relay IO for reversing the run direction of the tape recorder M and on the other hand the image pips TI or the tape pips TB intended to be applied to the logic circuits 7 of the device D and to the write head ETB of the tape recorder M, respectively.

The working out of the order of command of run direction is effected by the circuits shown in the upper right-hand portion of the Figure:

The collector of transistor Q4 is connected by a direct poled diode D4 on the one hand to a resistor P4 connected to the source +W and on the other hand to one plate of condensor C4 the opposite plate of whic is kept by an associated diode at the potential of the middle point of a voltage divider bridge consisting of resistors S, S' connected in series between the voltage source +W and the ground; this second plate of capacitor C4 is moreover connected through the medium of a diode D5 to a delay circuit consisting of a resistor R5 and capacitor C5 connected in series between the voltage sources +W and −V. When the transistor Q4 is blocked off, the capacitor C4 is charged through the circuit comprising the resistor R4, the associated diode and the resistor S' of the divider bridge; when the transistor Q4 becomes on or conducting, the capacitor C4 is discharged through the resistor R5, the diodes D5, D4 and the transistor Q4; thus the capacitor C5 previously charged throught the resistor R4 is quickly discharged and after transistor Q4 has returned to the blocked or off condition recovers its charge slowly only at a rate depending upon the time constant of R5-C5. Across the capacitor C5 is mounted the emitter-base junction of transistor Q5 the collector of which is connected to the voltage source +W by a load resistance Z5. The transistor Q5 is therefore normally brought in the on or conducting condition by the potential across the capacitor C5 and remains blocked or off during a period depending upon the charging time constant of said capacitor from the time it is discharged to the incoming of the first negative slope of a film pip TF. With transistor Q5 is associated a complementary transistor Q6 of PNP type the emitter of which is connected to the voltage source +W and the collector of which is connected to the source −V through the medium of a load resistor Z6; the base of transistor Q6 is connected through a resistive coupling P6-P'6 to the collector of transistor Q5 the base of which is connected to the collector of transistor Q6 by a capacitor C6 and a resistor R6 connected in series. The arrangement thus provided by the transistors Q5, Q6 and the associated delay circuit R5-C5 forms a sharp switching univibrator providing at the output, across the load Z6 of the collector of transistor Q6, a negative frame or square pulse of a width or duration higher than that of the single pulse or pair of pulses appearing across the shaping transistor Q4 at the incoming of each film pip TF.

The combination of these pulses and frame or square pulse is used to differentiate the forward and backward run orders AV and AR:

For this purpose the collector of transistor Q4 is connected by a direct poled diode D'4 on the one hand to the voltage source +W through a resistor R'4 and on the other hand to one plate of a capacitor C'4 the opposite plate of which is connected to the collector of transistor Q6 by a resistor Z'6. Thus when transistor Q6 normally in the on or conducting condition is blocked or off at the incoming of the first negative slope of a film pip TF, the capacitor C'4 becomes connected to the voltage source −V and through the medium of the resistors Z6, Z'6 on the one hand and through the medium of transistor Q4 on the other hand since for every negative slope of the film pip TF transistor Q4 put in the on condition brings the positive plate of capacitor C'4 back to the potential −V. When transistor Q4 is again blocked or put off at the end of the first pulse, the capacitor C'4 transmits a positive pulse to the resistors Z6, Z'6. Afterwards in the case where the film pips TF exhibit two negative slopes thereby corresponding to the reverse motion of the camera C or of the projector P, when the transistor Q4 is put on again, the capacitor C'4 transmits a negative pulse to the resistors Z6, Z'6 still connected to the source −V since transistor Q6 is still blocked or off.

This pulse transmitted by the capacitor C'4 negatively biases through the medium of a diode D7 and a resistor R7 the emitter of a transistor Q7 the common base of which is connected to the source −V, its collector being connected to a source +V through the medium of a load resistor Z7. By a proper selection of the values of the elements involved, the emitter of transistor Q7 becomes thus positively or negatively biased with respect to its base according as the pip TF comprises one or two negative slopes, respectively hence depending upon the run direction of the camera C or the projector P.

The conducting or non-conducting condition of transistor Q7 therefore discriminates the run direction. When the transistor Q7 is conducting it biases into conduction an associated complementary transistor Q8 the voltage of which across the collector load Z8 positively biases through the medium of a resistor R9 and a diode D9 the base of an amplifier transistor Q9 decoupled by a capacitor C9; transistor Q9 thus brought into conduction feeds its collector load Z9 thereby to unblock an output transistor Q10 by which is fed the relay IO for reversing the run direction of the tape recorder M, the protection of the transistor being provided for by a resistor Z10 and a capacitor C10.

In addition to working out the order or command of run direction thus obtained, the coupling circuits 5 provide for the production of the image pips TI intended to be applied to the logic circuits 7 of the device D and the tape pips TB intended to be recorded by the tape recorder M onto the magnetic tape B:

To this end, the output of the shaping transistor Q4 is connected through the medium of the diode D'4 to one plate of a capacitor C''4 the other plate of which is connected by an associated diode to the middle point of the voltage divider bridge S, S' already mentioned. This second plate of capacitor C''4 is on the other hand connected through the medium of a diode D11 to a delay circuit consisting of a resistor R11 and a capacitor C11. The voltage across the capacitor C11 should therefore put on a transistor Q11 the emitter and collector of which are connected to the ground and to the source +W, respectively, through the medium of a load resistor Z11. Like capacitor C5 however the capacitor C11 becomes discharged at the incoming of the first negative slopes of every film pip TF and in fact owing to the large value of the time constant of R11.C11, the transistor Q11 remains blocked or off. The collector of transistor Q11 is connected by two diodes D12 on the one hand to the base of transistor Q12 the emitter of which is grounded through the tape pip write head ETB of the tape recorder M and on the other hand to the middle point of its collector load Z12, Z'12 connected to the voltage source +W. This means that the transistor Q12 is normally on and could become blocked or off only in the case of no incoming of any film pip TF beyond a time period set by the time constant R11.C11. The tape pip write head ETB therefore receives from transistor Q12 a direct current which is effective to saturate the magnetic material of the tape B to prepare same for recording the tape pip TB. The latter reaches the write head ETB through the medium of a diode D13 mounted in parallel on transistor Q12 and of a capacitor C13 connected on the one hand to the voltage source +W by a resistor R13 and on the other hand to the collector of transistor Q5 through a reverse poled diode D'5; thus the saturation current supplied by transistor Q12 is momentarily cut off upon transistor Q5 returning to the conducting condition by a negative tape pip TB provided by the voltage drop across the resistor R13 and transmitted by the capacitor C13 and the diode D13.

A write-read switch E/L enables in the reading position to keep transistor Q12 blocked or off by grounding its base through a diode D'12 and to quench the tape pip TB by connecting the resistor R13 to the source −V through a diode D'13. A tap TEL on the collector of transistor Q11 enables to remote-control the stop of the tape recorder M in the absence of film pips TF.

The tape pips TB thus recorded on the magnetic tape are read later on by the coupling circuits 6 the detailed diagram of which is given in FIG. 6: the signal appearing across the tape pips reading head LTB is applied through a filter consisting of a resistor R14, a shunting diode D14 and a capacitor C14 across a resistor P14 for biasing the input of an operational amplifier AO which therefore receives a positive pulse at the reading of each tape pip TB. The operational amplifier AO provided with d.c. as well as a.c. feedback loops provides at the output a negative frame or square pulse which is applied through a connecting capacitor C15 to the base of a transistor Q15 connected by a biasing resistor P15 to the voltage source −V to which is also connected the emitter of transistor Q15 the collector of which is fed by the voltage source +W through a load resistor Z15. A feedback circuit consisting of a resistor R15 and a diode D15 improves the shape of the negative output frame or square pulse taken from the collector of transistor P15. This negative frame or square pulse forms a sound pip TS intended to be applied to the corresponding input of the logic circuits 7 which will now be described.

These logic circuits the detailed diagram of which is given in FIG. 7 consists of two identical arrangements at the inputs of which are respectively applied the above-mentioned sound pips TS and the image pips TI for instance taken from the collector of transistor Q6 of the coupling circuits 5. The tape pips TB and the image pips TI are applied to attenuators consisting respectively of resistors R16-R′16 and R17-R′17; the resistors R′16 and R′17 decoupled by a capacitor of very low capacity are respectively shunted by push-buttons D+ and D− which upon being depressed cancel any effects of the sound pips TS and image pips TI, respectively. At the incoming of each sound or image pip, a capacitor C16, C17 previously charged under the polarity indicated is quickly discharged through a diode D16, D17 and then is charged again at the end of the pip through the input resistor R16, R17 and a resistor P16, P17 across which therefore appears a positive voltage pulse serving to operate a switch Q16, Q17.

Each one of the switches Q16, Q17 consists of a semi-conductor integrated circuit known under the name BRY39 which is equivalent to a pair of complementary transistors X, Y mounted head to tail in cascade as shown by the inset. The connection 1 connects the resistor P16, P17 to the base of NPN transistor X and to the collector of PNP transistor Y, the emitter of which is connected by the connection 2 to the voltage source +V through a resistor Z′16, Z′17 mounted in parallel with a capacitor C′16, C′17; the same voltage source +V is connected through a resistor Z16, Z17 to the connection 3 leading to the base of transistor Y and to the collector of transistor X. The connections 4 connect the emitters of both transistors X to a same load resistor R20 connected to the voltage source −V and decoupled by an associated capacitor. The resistor Z16, Z17 is moreover connected to the emitter of transistor Q18, Q19 the collector of which is itself connected to the voltage source −V through a load resistor Z18, Z19 whereas its base is biased by a voltage divider bridge consisting of resistors P18–P′18, P19–P′19 mounted in series between the voltage sources +V and −V.

At rest both switches Q16, Q17 are blocked or off, the base and the emitter of their transistor X being both at the voltage −V whereas the emitter of their transistor Y is at the potential +V and its base is insufficiently biased in the negative direction by the voltage drop produced across the resistors Z′16, Z′17 by the saturation current of transistor Q18, Q19 which is normally on or conducting.

When a positive pulse is applied to the input 1 of one of the switches Q16, Q17, said switch in unblocked provided expressly that the other switch is then not conducting, which would provide across the common load resistor R20 a potential sufficient to prevent forward biasing of the base-emitter junction of NPN transistor X of the first aforesaid switch. The switch Q17 will therefore be assumed to be blocked or off at the time where the switch Q16 receives a positive unblocking or enabling pulse. This pulse biases the lower transistor X into conduction so that the voltage drop across its collector load Z16 becomes suficient to on the one hand block or disable the transistor Q18 and on the other hand forward bias the emitter-base junction of the upper transistor Y which is therefore biased into conduction and which in return through the effect of the voltage drop across the resistor P16 tends to increase the base-emitter voltage of the lower transistor X. The switching thereby provided quickly raises to a high value the intensity of the current flowing through the load resistor R200 thereby having the effect of increasing the emitter potential of transistor X and therefore reducing the current flowing therethrough; in a corollary manner, the decrease in voltage drop across the resistor Z16 reduces the negative bias of the base of transistor Y and therefore tends to cause a reduction of the current flowing therethrough which in return tends to reduce the voltage drop across the resistor P16 hence to decrease the bias potential of transistor X. In bulk, the load current flowing through resistor R20 therefore tends to decrease spontaneously; this current decrease across R20 in in fact essentially controlled or monitored by the discharge of capacitor C′16 mounted in parallel with resistor Z′16 and therefore occurs according to a law set by the time constant of the delay circuit thus formed the action of which tends to slow down the raising of the potential at the emitter of transistor Y and therefore to accelerate the decrease of the current flowing through the load resistor R20. This current is in fact abruptly cut off as soon as the emitter-base biasing potential of transistor Y becomes insufficient to maintain same in the conducting state thereby resulting in immediate blocking or disabling of transistor X and in a corollary manner the return of transistor Q18 to the conducting condition.

In summary, when a sound pip TS or an image pip TI is applied to the corresponding input of the arrangement while the switch associated with the other input is blocked or disabled there appears across the load resistor R20 a positive pulse T exhibiting the shape shown and the outset of which coincides with the positive edge terminating the received image or sound pip and the duration of which is set by the characteristics of the switching device and by the time constant of Z′16-.C′16, Z′17.C′17. At the same time there appears across the resistor Z18 or Z19 according as a sound pip TS or an image pip TI has been received, a negative rectangular pulse called (s) or (i), respectively, the beginning of which coincides with that of the pulse T and the width or duration of which is identical with that of the latter.

In the case where a sound pip TS and an image pip TI are received simultaneously or follow each other at a time interval lower than the width or duration of a pulse T, the first pip received drives the corresponding switch Q16, Q17 into conduction thereby presenting as already mentioned the unblocking or enabling of the other switch at the receipt of the second pulse. The latter is however stored by the capacitor C16, C17 involved the incompleted discharge upon return to the blocking or disabling condition of the first switch drives the switch blocked into the time into conduction and enables the production of a second pulse T accompanied by the corresponding pulse (s) or (i).

Every pulse T worked out by the circuits of FIG. 7 is applied together with the pulse (s), (i) which accompanies same to the correspondant inputs of the counting circuits 8 the detailed diagram of which is given in FIG. 8.

The pulses T taken from the terminals of resistor R20 are at first shaped by a univibrator system essentially consisting of a pair of transistors Q20 and Q21. The emitter of the NPN type transistor Q20 is connected to the voltage source −V whereas its base and its collector are connected to the voltage source +V by a biasing resistor P20 and a load resistor Z20, respectively. This transistor Q20 is therefore normally conducting or on. The emitter of the PNP type transistor Q21 is directly grounded whereas its collector is connected to the voltage source −V by a load resistor Z21; with its base connected by a resistor Q21 shunted by a capacitor to the collector of the normally conducting transistor Q20, the transistor Q21 is normally conducting too. A feedback coupling consisting of a capacitor C'21 connected in series with a resistor R'21 connects the base of transistor Q20 to the collector of transistor Q21 to the base of which are applied the pulses T through the medium of a capacitor C21. The positive edge of each pulse T blocks the transistor Q21 thereby causing the blocking of transistor Q20, both transistors then remain in the blocked or off condition during a period depending upon the time constant of R'21. C'21 and upon the brake down or starting voltage of transistor Q21. Thus there appears at the collector of the latter at the incoming of every pip T, a negative frame or square pulse with steep edges the width or duration of which is selected to be equal to a fraction of that of the pips T and of the pulses (s), (i) accompanying same.

The negative frames or square pulses provided at the output of the univibrator Q20, Q21 are applied to the drive input of the first flip-flop circuit B1 of a binary counter with sixteen positions or steps comprising three other cascade-mounted flip-flop circuits B2, B3 and B4. Each one of these flip-flop circuits changes its state when a positive step is applied to its drive input shown by an arrow; consequently the first flip-flop circuit B1 changes its state at the end of each negative frame or square pulse provided by the univibrator Q20, Q21, i.e. with a certain delay with respect to the beginning of the pip T the incoming of which has caused said frame of square pulse to appear and therefore with respect to the beginning of pulse (s), (i) which accompanies this pip. The inputs of both gates 0, 1 of each flip-flop circuit B1-B4 are connected to the voltage source −V whereas their outputs are connected to the voltage source +V by respective load resistors, a directly or forward poled diode being interposed between the output of the gate 1 and its load resistor ZB1-ZB4. The input of each flip-flop circuit B2-B4 grounded through a resistro RBS-RB4 is connected to each one of the outputs of the preceding flip-flop circuit through a connecting circuit comprising a diode and a capacitor connected in series the junction of which is connected on the one hand to the voltage source +V through a respective biasing resistor PB2-PB4 and on the other hand through a respective diode forwardly or directly poled at the input (s) or (i) of the arrangement according as said circuit leads to the output 1 or 0, respectively, of the preceding flip-flop circuit.

Thus the diode of each connecting circuit is conducting or on or is blocked or off according as a pulse is present or not at the input (s) or (i) of the arrangement to which said circuit is connected. As a matter of fact, in the presence of such a pulse, the current flowing through the resistor PB2-PB4 associated with the connecting circuit maintains the junction thereof at the potential of the source −V whereas in the absence of any pulse, this junction is kept through the same resistor at the potential +V; consequently the diode of the connecting circuit either has a current flowing therethrough and coming from the ground through the corresponding resistor RB2-RB4 or is blocked or off, respectively, its cathode being kept at the potential +V in the absence of any flow of current through the associated resistor PB2-PB4. When the diode of a connecting circuit is thus made conducting or put on, it may have the positive potential step provided at the opening of the corresponding gate of the preceding flip-flop circuit flowing therethrough; this positive potential step is on the contrary stopped by the diode of the connecting circuit when same is blocked or off.

On the whole the counter consisting of the flip-flop circuits B1-B4 operates in the following manner:

At the incoming of every pip T, the univibrator Q20, Q21 supplies a negative pulse the terminal positive step of which causes the switching of the flip-flop circuit B1 the initially opened gate of which closes and the other initially closed gate of which opens; at the output of the gate thus opened in view of the cutting out of the current across the associated load resistor, there appears a positive voltage step which is transmitted or not by the diode of the corresponding connecting circuit to the drive input of the flip-flop circuit B2 according as a pulse (s) or (i) is present or not at the corresponding input of the arrangement to which said connecting circuit is coupled; as the case may be, the flip-flop circuit B2 is switched or not. The switching of the flip-flop circuits B3 and B4 is controlled by a similar process through the changes of state of the flip-flop circuits B2 and B3 respectively.

Starting from the initial condition of the counter shown (a dashed line and a solid line representing the open gate and the closed gate of each flip-flop circuit, respectively) which is accounted for hereinafter, the incoming of a pip T accompanied by a pulse (s) causes the switching of the flip-flop circuit B1 which does not effect the flip-flop circuit B2 ; if the following pip T is accompanied by a pulse (i), the flip-flop circuit B1 is switched again, this time again without any effect upon the flip-flop circuit B2. With the further pips T alternately accompanied by pulses (s) and (i), each opening of a gate of the flip-flop circuit B1 occurs while no pulse (s), (i) is applied to the corresponding connecting circuit. Consequently the flip-flop circuit B2 is never switched, neither are the flip-flop circuits B3 and B4, so that the contents of the counter, read from the right to the left, are alternatively 1000 and 1001.

When starting from this same initial condition but upon assuming that the first pip T is accompanied by a pulse (i), the flip-flop circuit B1 is switched but this time causes the change in the state of the flip-flop circuit B2 which itself results in the switching of the flip-flop circuit B3 hence of that of the flip-flop circuit B4. The contents of the counter as read from the right to the left has therefore become 0111 or otherwise stated has decreased by one binary unit. The next pip being accompanied by a pulse (s), the counter is reset to its initial state. With this cycle repeated, the contents of the counter therefore assume the values 1000 and 0111, alternatively.

Again upon starting from the same initial conditions, it should be assumed that the counter receives two successive pips accompanied by pulses (s). Then the flip-flop circuit B1 having being switched at the receipt of the first pip, the contents of the counter become 1001 and then become 1010 at the receipt of the second pip, the change in state of the flip-flop circuit B1 then resulting in that of the flip-flop circuit B2. The contents of the counter have thus been increased by two units. If the following pip is accompanied by a pulse (i), the flip-flop circuit B1 and the flip-flop circuit B2 change their state, so that the content of the counter is reset to 1001. If on the contrary the next pip is again accompanied by a pulse (s), only the flip-flop circuit B1 changes its state and the content of the counter increases again by one unit to reach 1011.

Reversely if both first pips T are accompanied by pulses (i), the first one as already mentioned causes the content of the counter to become 0111 ; at the receipt of the second pip, only the flip-flop circuit B1 changes its state and the content of the counter is decreased by one unit to become 0110 ; if the third pip recived is accompanied by a pulse (s), the content of the counter returns to 0111 whereas if it is again accompanied by a pulse (i), it is decreased again by one unit and becomes 0101.

Through like reasonings it may be appreciated that when the successive pips received by the arrangement are alternatively accompanied by pulses (s) and (i), the content of the counter fluctuates or swings between two adjacent values which are increased or decreased by one unit every time the counter receives two successive pulses (s) or two successive pulses (i), respectively, i.e. when the magnetic tape leads with respect to the film or reversely, respectively. In other terms the content of the counter forms at any time a measure of the relative speed of the magnetic tape with respect to the film and may therefore be used as deviation variable for cancelling this relative speed hence for providing for the synchronous travelling of the film and tape.

For this purpose the load resistors ZB1-ZB4 of the gates 1 of the flip-flop circuits B1-B4 are connected to the voltage source —V through the medium of respective forwardly biased diodes and of a capacitor C22 shunted by a resistor R22. Moreover the ohmic values of the diodes ZB1-ZB4 considered in this order decrease according to a given law for example substantially according to a geometrical ration for the stated values ; this means that upon being fed under a same potential the resistors ZB1-ZB4 have currents flowing therethrough the respective magnitudes of which increase according to a geometrical progression. Now each one of these resistors is directly connected or not to the voltage source —V, according as the associated flip-flop circuit B1-B4 is in the state 1 or 0, respectively. In the first case a resistor cannot supply any current to the capacitor C22 from which it is insulated by a reverse biased diode ; in the second case the resistor involved supplies to the capacitor C22 a load current which is inversely proportional to its ohmic value and proportional to the supply voltage 2V minus the voltage across the capacitor. For the stated values of the resistors ZB1-ZB4 or proportional values and when taking as a unit the magnitude $i$ of the current which may be supplied by the resistor ZB1, the total load current supplied to the capacitor C22 may thus vary between 0 and substantially $(1+2+4+8)\, i = 15\, i$ according as the content of the counter is 1111 and 0000, respectively, the magnitude of the current varying in the reverse direction with respect of the value of the content of the counter.

At any time the voltage across the capacitor C22 corresponds to the integration of the total load current which has been previously supplied thereto through the resistors ZB1-ZB4 decreased by the magnitude of the discharge current flowing through the resistor R22. This means that this voltage decreases when the content of the counter increases hence the magnetic tape is leading with respect or ahead of the film and conversely.

The potential across the capacitor C22 may therefore be used to correct the unwinding speed of the magnetic tape. For this purpose the capacitor C22 is connected to the base of a NPN type transistor Q22 grounded through a protection diode to which is directly connected the collector of the transistor the emitter of which feeds a load resistor Z23 connected to the potential —V. The voltage drop across this resistor biases the base of a NPN type transistor Q23 provided with emitter and collector loads R23-Z23 connected to the voltage source —V and +V, respectively. The amplifier-adapter stage thus provided may supply at the output, at the collector of transistor Q23, a current of a magnitude which is sufficient to feed, after possible filtering and amplifying, the armature J of the motor of the tape recorder M providing for the drive of the magnetic tape B (see FIG. 2). This current therefore forms the order or modulation of the tape unwinding speed ±DB previously mentioned.

In order that the unwinding of the magnetic tape may be accelerated or braked with respect to the film travel, the elements of the circuits of FIG. 8 providing for the conversion of the digital information contained in the counter B1-B4 into analogue values (voltage across the capacitor C22 and then current ± DB) are selected to be such that the normal magnitude of this current is achieved for a means value of the content of the counter for example the value 1000 previously selected for the initial value. Effectively from this average value, the counter may count eight positions of increasing or decreasing values thereby enabling in automatic operation an accurate phase-locking of the speed of the magnetic tape to that of the film and in semi-automatic operation a very efficient action of the push-buttons D+ and D— enabling to compensate most quickly for the lag and the lead of the magnetic tape with respect to the film, respectively, when seeking the synchronization of the sound with the images.

Another significant advantage inherent to the construction of the counting and conversion circuits of FIG. 8 is to take advantage of the integration provided by the capacitor C22 for freeing the unwinding speed of the magnetic tape B from the influence of possible fast fluctuations of the velocity of the camera C during the take or shot. In this manner when reading or playing back the magnetic tape B or the sound record transferred onto the film magentic track, any risk of induced fluttering or rowing is substantially removed.

It should be understood that the invention is not at all limited to the example of application and to the form of embodiment which have been described and shown ; on the contrary the invention comprises all the means forming technical equivalents to those described and illustrated as considered separately or in any combination and used within the scope of the appended claims.

What is claimed is:

1. A method for recording and reproducing in synchronism pictures and sounds of a filmed scene, said method comprising a first step which consists in simultaneously recording the pictures and sounds, respectively, on a photographic film and on a magnetic tape, each being driven independently of the other by independent drive means, while generating recurrent pulses, in synchronism with the driving of said film, and recording said pulses on a separate track of said magnetic tape, and thereafter developing said film, said tape being provided with a blank sound track
   - a second step which consists in projecting the scenes of the developed film and playing back said tape for simultaneously reproducing the pictures and the sound characteristic of said scene in proximate time correspondence, generating control pulses in synchronism with said film drive while reading said recurrent pulses recorded on said tape, counting said control pulses and recorded recurrent pulses and automatically controlling one of the drive means for adjusting the respective counts of said control pulses and recorded pulses so as to be substantially equal whereby to improve the picture synchronization with sound, ideal synchronization of the picture and sound being achieved by selectively and momentarily manually discontinuing either of said counts,
   - a third step which consists in reversely driving said film and tape to the beginning of said scene while preserving said ideal synchronization by counting said control pulses and recorded pulses and automatically controlling one of said drive means as in said second step,
   - and a fourth step which consists in again driving said film and tape in the normal forward direction for simultaneously reproducing said pictures and said sound from the beginning to the end of said scene while preserving said ideal synchronization as in said third step, and transferring the sound recorded on the tape in the first step to the blank sound track on the tape.

2. A method according to claim 1, wherein said recurrent pulses generated during said first step have a shape enabling discrimination between the normal and reverse driving directions of said film, said tape being automatically driven in the same respective direction as said film during said second, third and fourth steps.

3. A device for recording and reproducing in synchronism pictures and sound corresponding to a filmed scene, comprising
   - a camera for taking pictures adapted for development as a photographic film, a projector for reproducing said pictures on said film, said camera and projector each being provided with respective drive means for driving said film at a predetermined speed and with associated generating means for respectively generating recurrent pulses and control pulses in synchronism with the driving of said film,
   - a sound recorder for recording sound associated with said scene on a magnetic tape and for playing back said sound recorded on said tape, said recorder being provided with means for driving said tape at a controllable speed and with means for recording said recurrent pulses on a separate track of the said tape and then playing back said recorded pulses,
   - first coupling means for connecting said camera to said recorder when said camera is taking pictures and for recording said sound associated with said scene, said coupling means being operative for transmitting said recurrent pulses from said generating means to said recording means,
   - and second coupling means for connecting said projector to said sound recorder, when projecting said pictures, for playing back said sound, said second coupling means including counting means connected on the one hand to said generating means of said projector for counting said control pulses and on the other hand to said play back means of said recorder for counting said recorded pulses, said counting means supplying an output signal representative of the difference between the respective counts of said control pulses and recorded pulses, automatic control means operatively coupled to said counting means and to said driving means of said recorder for changing in response to said output signal the driving speed of said tape to reduce said difference between said counts, and thereby to improve the synchronization between said sound and said pictures, manually operated control means operatively associated with said counting means for selectively and momentarily discontinuing the count of one of said control and recorded pulses to perfect said synchronization, said means for counting said control pulses and recorded pulses including second circuit means operative for converting said pulses into identical calibrated pulses having a characteristic signal indicating its origin, and third circuit means including a single counter having a single data input receiving said calibrated pulses and also a pair of control inputs respectively receiving said characteristic signals indicative of either pulse origin, whereby said counter counts each of said calibrated.

4. A device according to claim 3, wherein said third circuit means include timing means operative to delay the feeding of each said calibrated pulses to said data input of said counter with respect to the feed of said characteristic signal to the relevant one of said control inputs of said counter.

5. A device according to claim 4, wherein said counter comprises a plurality of cascaded flip flop circuits each having one input and two outputs, the input of the first one of said flip flop circuits constituting said data input of said counter receiving said calibrated pulses, said first flip flop circuit in the cascade changing in state with each incoming pulse, the input of each of the following flip flip circuits being connected to both outputs of a preceding flip flop circuit by respective connecting circuits each including a normally reverse-biased, unidirectionally conducting element operatively coupled to a respective aforesaid control input of said counter for selective forward biasing by the relevant aforesaid characteristic signal, the switching of each one of said following flip flop circuits, triggered by a change of state of either output of the preceding flip flop circuit, being inhibited in the absence of a relevant characteristic signal at the corresponding control input of said counter.

6. A device according to claim 5, wherein the combinations of the states of said flip flop circuits determines the strength of a load current supplied to a capacitor shunted by a resistor, the mean voltage across said capacitor determining the magnitude of said output signal of said counting means.

7. A device according to claim 6, wherein one output of each aforesaid flip flop circuit is operatively connected on the one hand through a respective resistor to one terminal of a voltage source supplying said load current to said capacitor and on the other hand through a diode to said capacitor.

8. A device according to claim 7, wherein said resistors are respectively associated with said flip flop circuits and have respective ohmic values which decrease in accordance with the position of said flip flop circuit in the cascade.

9. A device according to claim 1, wherein said second circuit means operative for converting said control pulses and recorded pulses into said calibrated pulses and characteristic signals include means for delaying one of any two control and recorded pulses simultaneously received.

10. A deivce according to claim 9, wherein said second circuit means comprise first and second input capacitors operatively effective to store said control and and recorded pulses, respectively, first and second monostable switch means having respective triggering input circuits coupled to said first and second capacitors, respectively, and respective main output circuits connected in parallel to a common load supplying said calibrated pulses, said first and second switch means being operatively related so that they cannot simultaneously be switched on, and monitoring respectively third and fourth switch means provided with respective loads supplying said characteristic signals.

11. A device according to claim 10, wherein each one of said first and second switch means comprises first and second complementary transistors mounted head to tail in cascade arrangement with the base of said first transistor connected to the collector of said second transistor for providing said triggering input circuit, the collector of said first transistor being connected with the base of said second transistor by a resistor to a voltage source, to which the emitter of said second transistor is coupled through a parallel time-constant circuit, the emitter of said first transistor constituting said output circuit connected to said common load supplying said calibrated pulses.

12. A device according to claim 11, wherein each one of said third and fourth switch means comprises a transistor, the base of which is held at a predetermined voltage, the emitter of which is connected to the collector of the relevant aforesaid second transistor, and the collector of which is connected to said respective load supplying the relevant aforesaid characteristic signal.

13. A device according to claim 10, wherein said manual control means operative for discontinuing the count of either one of said control pulses and recorded pulses comprises first and second push-button switches respectively associated with said first and second storage capacitors and operative when depressed for preventing the relevant pulses from being charging the respective capacitor.

14. A device according to claim 10, wherein said first and second coupling means are incorporated in said sound recorder.

* * * * *